United States Patent
Pickett et al.

(10) Patent No.: US 7,434,375 B2
(45) Date of Patent: Oct. 14, 2008

(54) AUTOMATED SYSTEM FOR IN-FIELD STORAGE, TRACEABILITY AND UNLOADING OF HARVEST PRODUCTS OF HARVESTED MATERIAL FROM A HARVESTING MACHINE

(75) Inventors: Terence D. Pickett, Waukee, IA (US); Stephen M. Faivre, Kingston, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/525,772

(22) Filed: Sep. 22, 2006

(65) Prior Publication Data

US 2008/0072546 A1    Mar. 27, 2008

(51) Int. Cl.
B65B 9/13    (2006.01)
B65B 25/02    (2006.01)

(52) U.S. Cl. .............................. 53/450; 53/459; 53/469; 53/550; 53/567; 53/576

(58) Field of Classification Search ................... 53/567, 53/450, 459, 469, 479, 548–550, 576
See application file for complete search history.

(56) References Cited

U.S. PATENT DOCUMENTS

| | | | | |
|---|---|---|---|---|
| 3,229,320 A | * | 1/1966 | Cymara | 15/348 |
| 3,597,909 A | * | 8/1971 | Lauridsen et al. | 56/327.1 |
| 3,606,723 A | * | 9/1971 | Clark | 53/450 |
| 3,791,052 A | * | 2/1974 | Van Der Lely | 37/305 |
| 3,917,502 A | * | 11/1975 | Kline | 56/344 |
| 4,518,507 A | * | 5/1985 | Conner | 588/252 |
| 4,606,176 A | * | 8/1986 | Cundall | 53/567 |
| 4,607,703 A | * | 8/1986 | Wang | 171/1 |
| 4,621,666 A | * | 11/1986 | Ryan | 141/114 |
| 4,672,794 A | * | 6/1987 | Good | 53/440 |
| 4,938,006 A | * | 7/1990 | Korsgaard | 53/431 |
| 5,140,802 A | | 8/1992 | Inman et al. | 53/459 |
| 5,419,102 A | | 5/1995 | Inman et al. | 53/567 |
| 5,428,864 A | * | 7/1995 | Pemberton | 15/348 |
| 5,461,843 A | * | 10/1995 | Garvin et al. | 53/434 |
| 5,664,402 A | * | 9/1997 | Sandvik et al. | 53/384.1 |

(Continued)

FOREIGN PATENT DOCUMENTS

DE    2151116    * 3/1973

(Continued)

OTHER PUBLICATIONS

Machine Translation of German patent 2,151,116.*

Primary Examiner—Stephen F Gerrity
(74) Attorney, Agent, or Firm—Suiter Swantz pc llo (57) ABSTRACT

A system for collecting a harvested product is provided. The system may include a continuously constructed flexible container for collecting the harvested product. For instance, the continuously constructed flexible container is a continuous sheet of flexible material such as plastic. A sealing device may be included within the system which is operationally coupled to the continuously constructed flexible container to allow the container to be sealed in discrete increments. Further, the system includes a traceability device operationally coupled to each of the discrete increments of the continuously flexible container to allow the harvested product included within each increment to be tracked. The use of the continuously constructed flexible container allows the harvested product to be collected continuously.

18 Claims, 6 Drawing Sheets

U.S. PATENT DOCUMENTS

| | | | |
|---|---|---|---|
| 5,855,102 A * | 1/1999 | Chang | 52/604 |
| 5,893,260 A * | 4/1999 | McKenna | 53/451 |
| 6,119,531 A * | 9/2000 | Wendte et al. | 73/863.52 |
| 6,691,135 B2 * | 2/2004 | Pickett et al. | 707/104.1 |
| 6,748,724 B1 * | 6/2004 | Cullen | 53/469 |
| 6,796,504 B2 * | 9/2004 | Robinson | 235/462.13 |
| 7,050,938 B1 * | 5/2006 | Prater et al. | 702/182 |
| 7,138,919 B2 * | 11/2006 | Clare et al. | 340/572.1 |
| 7,207,154 B2 * | 4/2007 | Araujo | 53/410 |
| 7,243,476 B2 * | 7/2007 | Schneider | 53/399 |
| 2002/0124529 A1 | 9/2002 | van der Lely | 53/411 |
| 2004/0128953 A1 * | 7/2004 | Cullen | 53/459 |
| 2004/0144067 A1 * | 7/2004 | Cullen | 53/567 |
| 2005/0120682 A1 * | 6/2005 | Cullen | 53/459 |

FOREIGN PATENT DOCUMENTS

| | | |
|---|---|---|
| WO | 8600003 | 1/1986 |

* cited by examiner

AUTOMATED SYSTEM FOR IN-FIELD STORAGE, TRACEABILITY AND UNLOADING OF HARVEST PRODUCTS OF HARVESTED MATERIAL FROM A HARVESTING MACHINE

FIELD OF THE INVENTION

The present invention generally relates to the field of crop harvesting, and more specifically, to an automated system and method for in-field storage, traceability and unloading of harvest products of harvested material from a harvesting machine.

BACKGROUND OF THE INVENTION

Current methods for harvesting a crop such as grain typically involve a combine and a multitude of vehicles whose sole purpose is to off-load harvested grain from the combine. The objective is to configure a system that may allow the combine to continue harvesting operations in a continuous mode as much as possible. The more continuous the harvesting process by the harvesting equipment, the more efficient and thus, cost effective the process may be.

Presently employed methods and systems for crop harvesting do not allow the combine harvester to be used on a continuous basis. First, the combine must wait for trucks and other harvest equipment to arrive at the field and be prepared to off-load the harvested product. Further, the combine must wait while the harvested product is off-loaded. Finally, the amount of product harvested is limited by the amount of storage space available.

Accordingly, it would be desirable to provide a harvesting system and method that allowed for in-field storage, traceability and unloading of harvest products of harvested material from a harvesting machine.

SUMMARY OF THE INVENTION

The present invention is directed to a system and method to allow continuous harvesting. The system and method employ a device that allows the harvested product to be collected, sealed and stored with little interruption to the harvesting process.

In accordance with a first aspect of the present invention, a device for collecting and storing a harvested product is provided. In the present aspect, the device includes a continuously constructed flexible container such as a continuous sheet of flexible material (e.g., plastic) for collecting the harvested product. Further, the device may include a traceability device to allow the harvested product included within the container to be tracked. The use of the continuously constructed flexible container allows the harvested product to be collected continuously. Moreover, the container may be sealed with a sealing device so that the harvested product may be stored on field. Thus, the device allows the efficiency of harvesting a product to be increased in which the harvesting machine is no longer dependent upon the availability of additional harvesting equipment (e.g., trucks, carts, or wagons) or facilities (e.g., crop storage facilities).

In accordance with a further aspect of the present invention, a method of harvesting is disclosed. In an aspect, the method includes collecting harvested product within a continuously constructed flexible container. The collected harvested product may be sealed within the continuously constructed flexible container in discrete increments. Further, the method may include attaching a traceability device to each of the discrete increments of the continuously constructed flexible container to allow the harvested product included within each increment to be tracked.

In accordance with an additional aspect of the present invention, a system for collecting a harvested product is provided. The system may include a continuously constructed flexible container for collecting the harvested product. For instance, the continuously constructed flexible container is a continuous sheet of flexible material such as plastic. A sealing device may be included within the system which is operationally coupled to the continuously constructed flexible container to allow the container to be sealed in discrete increments. Further, the system includes a traceability device operationally coupled to each of the discrete increments of the continuously flexible container to allow the harvested product included within each increment to be tracked. The use of the continuously constructed flexible container allows the harvested product to be collected continuously.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 and 4-7, a device 100 for collecting and storing a harvested product is provided. In the present embodiment, the device 100 includes a continuously constructed flexible container 102 such as a continuous sheet of flexible material (e.g., plastic) for collecting the harvested product. For instance, the flexible container may be a continuous sheet of plastic forming a flexible tube 402 having heat sealed edges 408. The tube of plastic sheeting may be stored as a roll 502 and coupled to a harvesting machine 404, such as a combine. For example, as the combine 404 travels in a forward direction, the tube 402 may unwind from the roll as harvested product is directed into and stored within the tube 402. As the tube 402 unwinds from the roll 502 and harvested product is directed into the tube, the portion of the tube containing harvested product is directed onto the ground (ex.—onto a field) in a position generally behind the forward-traveling combine. Further, the device 100 may include a traceability device 104 to allow the harvested product included within the device 100 to be tracked. For instance, the traceability device 104 may be secured to discrete sections, such as sections which form heat-sealed divided segments 406 of the continuous sheet of flexible material (ex.—the tube) allowing one to document/track the amount of product contained within such sections. It is contemplated that the traceability device 104 may be a bar code, a radio frequency identification (RFID) tag, or other like devices. The use of the traceability device 104 allows the user to not only document the position of the harvested product on the field, but to track a number of parameters including the type of harvested product, the amount, and the date of harvest. Such information may be read and stored by a device included within a harvesting machine. Harvested product information may then be later accessed as desired.

Figure 1:
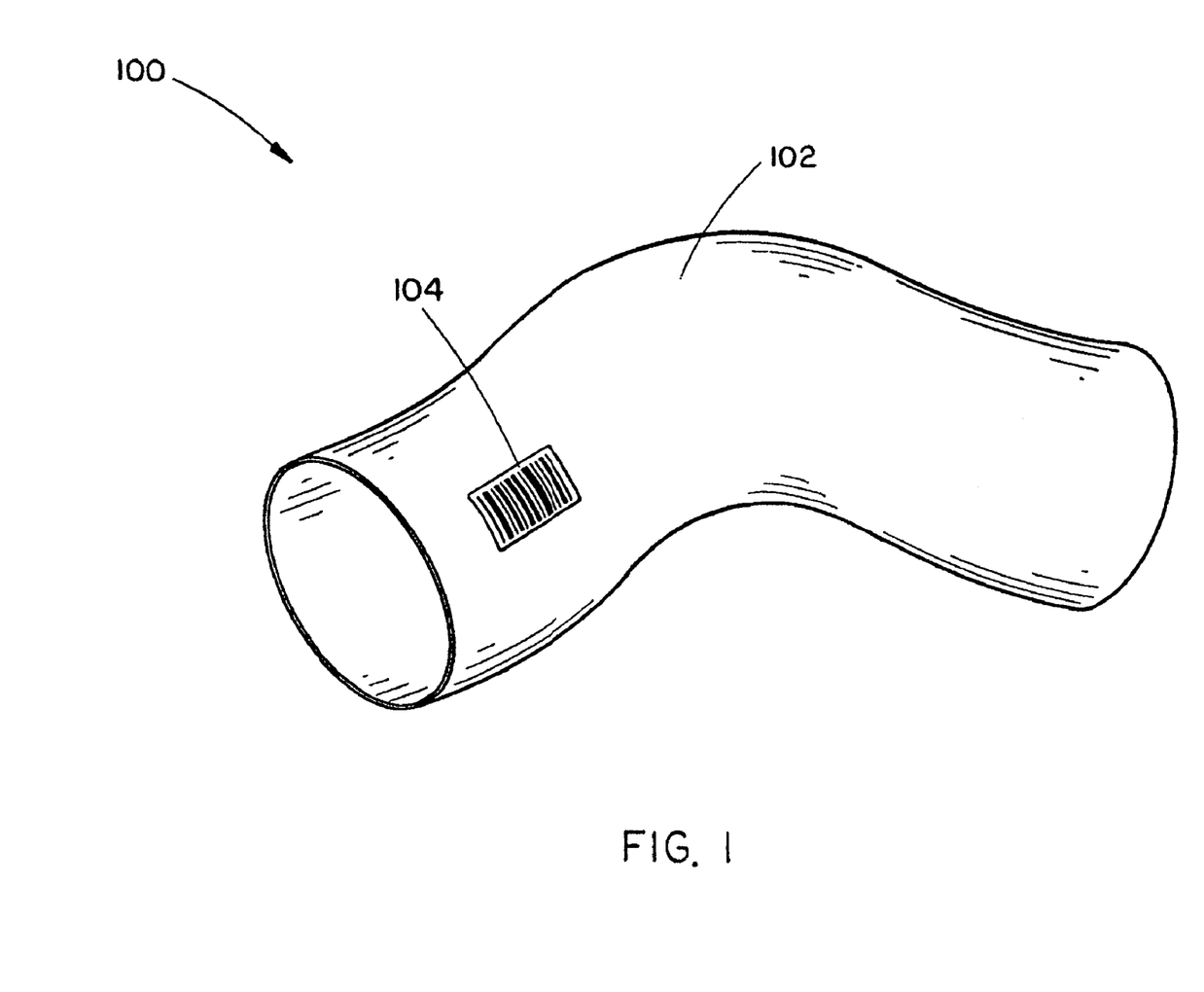
FIG. 1 is an illustration of a device for collecting and storing a harvested product in accordance with an exemplary embodiment of the present invention.

The use of the continuously constructed flexible container 102 allows the harvested product to be collected continuously. For example, the plastic tube may have harvested product directed into it by a combine as the combine moves in a generally forward direction. In addition, the plastic tube, as it unwinds from the roll, may be directed from the combine and layed along the field in a direction generally behind the moving combine. Moreover, the container 102 may be sealed with a sealing device so that the harvested product may be stored on the field. Thus, the device 100 allows the efficiency of harvesting a product to be increased due to the fact that the harvesting machine is no longer dependent upon the availability of additional harvesting equipment (e.g., trucks, carts, or wagons) or facilities (e.g., crop storage facilities). For example, the present invention may obviate the need for stopping harvesting in order to unload harvest product-holding tanks of the harvesting machines (ex.—combines). Also, the present invention may obviate the need for "on-the-fly" unloading, which requires coordination of a truck, cart, wagon or the like to travel alongside the harvesting machine (ex.—combine) for receiving harvested product from the harvesting machine. Further, by directing the container 102 (ex.—the tube containing harvested product) from the harvesting machine and laying it onto the field, fuel efficiency is promoted, since the amount of harvested product the harvesting machine has to carry on-board is reduced. Moreover, the present invention may promote design efficiency for harvesting machines, in that harvesting machines will no longer need as large of harvest product-holding tanks on-board. In addition, the traceability device allows the product to be stored and disbursed as desired. For example, RFID tags on containers after a specified date may be allocated to be sold at a reduced price or immediately due to the specified date.

Figure 2:
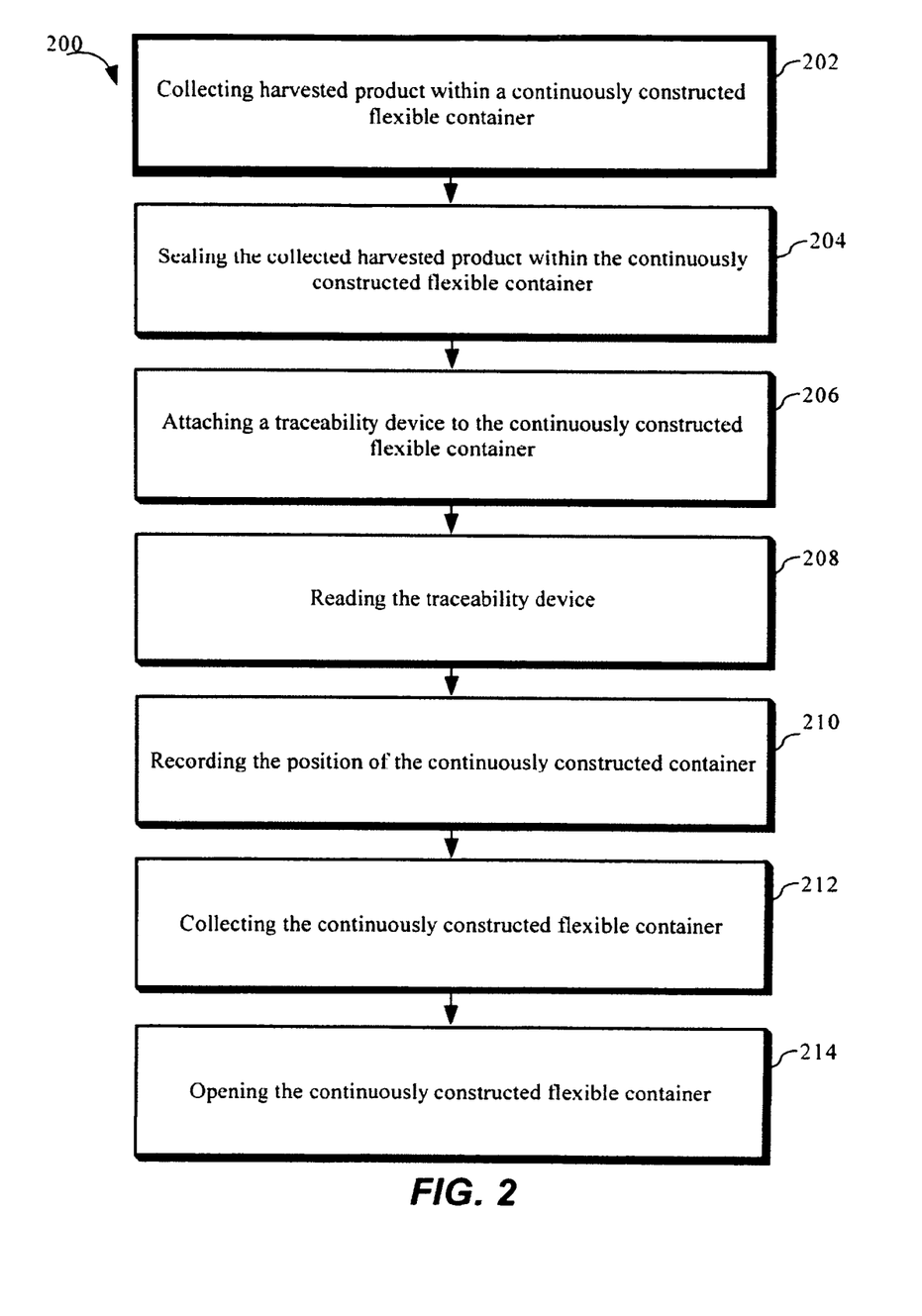
FIG. 2 is a flow diagram of a method of harvesting in accordance with an exemplary embodiment of the present invention.

Referring to FIG. 2, a method 200 of harvesting material is disclosed. In an exemplary embodiment, the method 200 includes collecting harvested product within a continuously constructed flexible container 202. As previously described, the continuously constructed flexible container may be a flexible sheet of material such as plastic. Further, the present embodiment includes sealing the collected harvested product within the continuously constructed flexible container 204. The collected harvested product may be heat-sealed in discrete increments to allow the amount of product to be documented. In addition, the method 200 may include attaching a traceability device to the continuously constructed flexible container 206 to allow the harvested product to be tracked. It is contemplated that the traceability device may include a bar code or radio frequency identification (RFID) tag.

In an embodiment, the method 200 may entail reading the traceability device 208 and recording the position of the continuously constructed container 210. For instance, the traceability device may be attached to each discrete increment of collected harvested product. A harvesting machine may read the traceability device and document the position of the harvested product that is within each increment/section of the sealed container. The information may be stored and later accessed. Such method allows harvested product to be stored on the field and to be accessed when desired in a systematic manner. Further, the present method allows a specific rate of grain storage to be accomplished if desired. For example, segregating product in approximately one meter discrete increments within the continuously constructed container may allows grain to be stored at approximately 1.25 bushels per second or fifteen acres per hour times three hundred bushels per acre per thirty-six hundred seconds per hour. In such example, the diameter of the container may range between approximately thirty and forty centimeters.

In further exemplary embodiments, the method 200 includes collecting the continuously constructed flexible container 212 and opening the continuously constructed flexible container 214. For instance, the continuously constructed flexible container may be opened automatically with an automated opener which allows the harvested product to be offloaded into a transporting instrumentality such as cart, truck, and the like. In an additional embodiment, an unloading device automatically opens (e.g., slits) a continuously constructed flexible container composed of plastic at the desired location in order to release the harvested product into the transporting instrumentality. In such embodiment, the flexible container is collected (e.g., rolled on a wheel) for recycling or other desired uses. For example, the used plastic containers may be deposited for recycling and a credit may be given to the user for such deposit.

Figure 3:
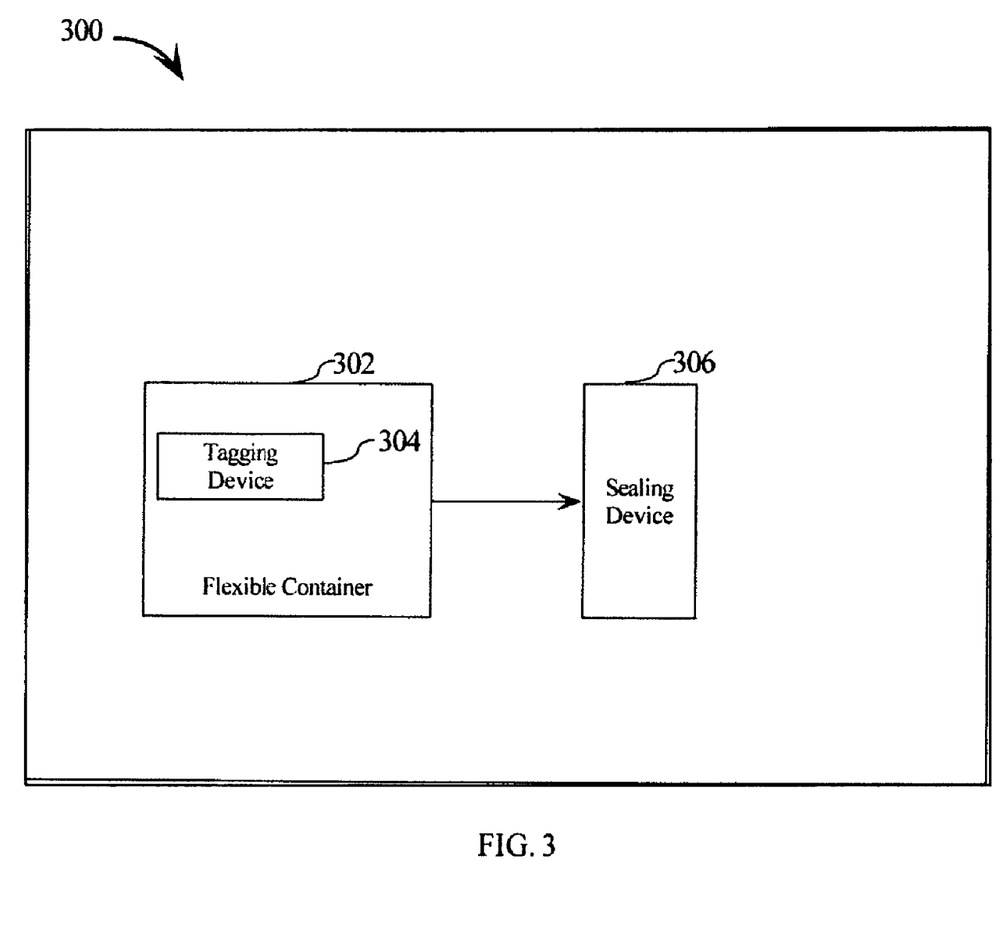
FIG. 3 is a block diagram of a system of harvesting in accordance with an exemplary embodiment of the present invention.
Figure 4:
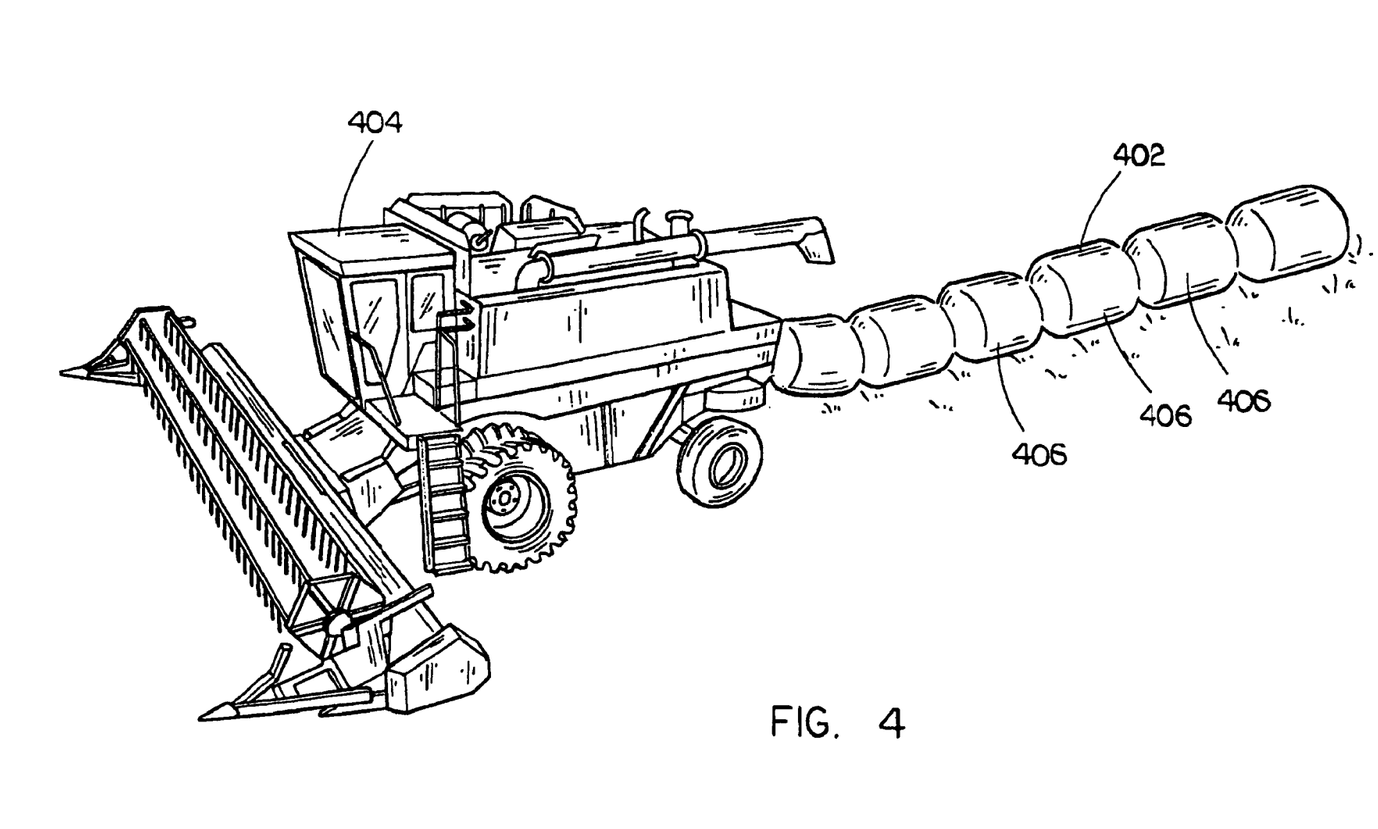
FIG. 4 is an illustration of a device for collecting and storing a harvested product, the device being operationally coupled with a harvesting machine in accordance with an exemplary embodiment of the present invention.
Figure 5:
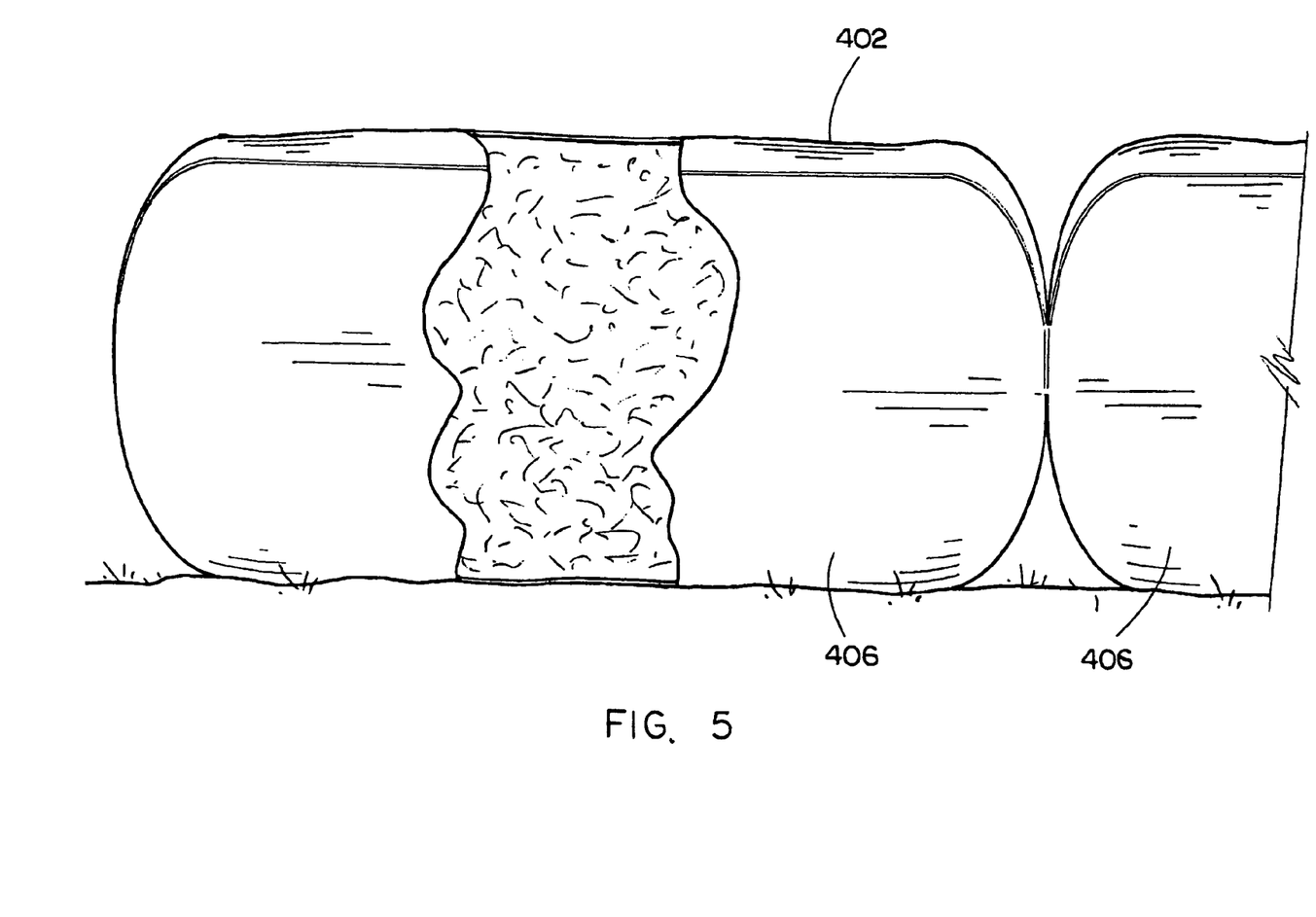
FIGS. 5-7 are illustrations of a device for collecting and storing a harvested product in accordance with exemplary embodiments of the present invention.
Figure 6:
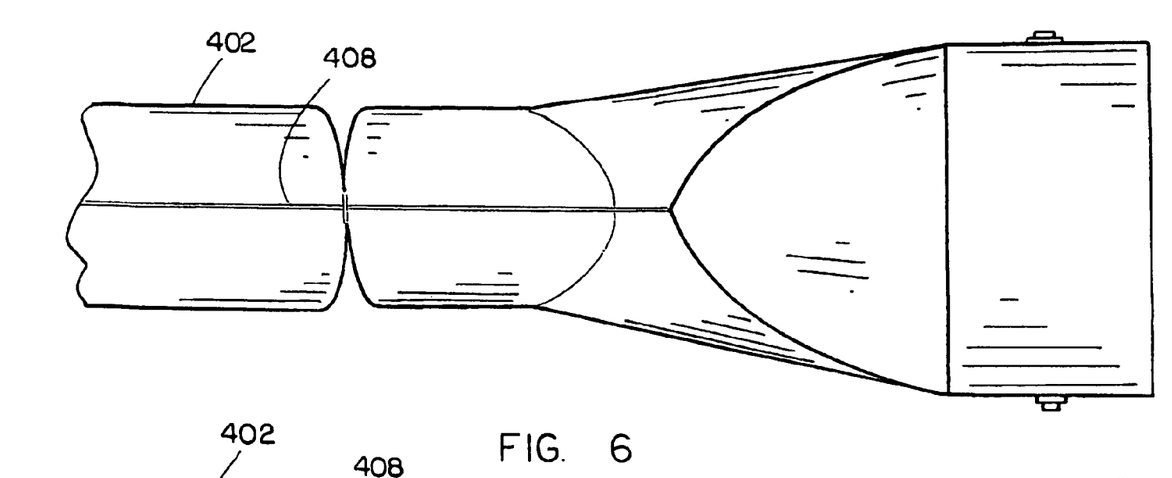
Figure 7:
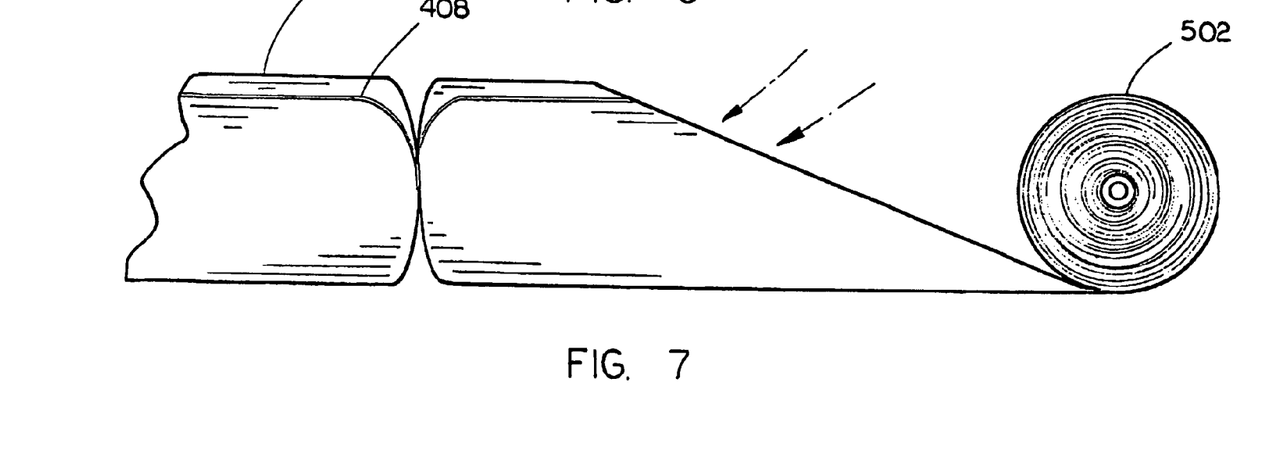

Referring to FIG. 3, a system 300 for collecting a harvested product is provided. The system 300 may include a continuously constructed flexible container 302 for collecting the harvested product. For instance, the continuously constructed flexible container 302 is a continuous sheet of flexible material such as plastic. A sealing device 304 may be included within the system 300 which is operationally coupled to the continuously constructed flexible container 302 to allow the container 302 to be sealed in discrete increments. Further, the system 300 includes a traceability device 306 operationally coupled to the continuously constructed flexible container 302. For example, a traceability device 306 is operationally coupled to each of the discrete increments of the continuously flexible container 302 to allow the harvested product included within each increment to be tracked. The use of the continuously constructed flexible container 302 allows the harvested product to be collected continuously.

In exemplary embodiments, the methods disclosed may be implemented as sets of instructions comprising software or firmware. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of harvesting, comprising:
   collecting harvested product within a continuously constructed flexible container, the continuously constructed flexible container being configured as a tube, the tube being formed of a continuous sheet of flexible, plastic material;
   sealing the harvested product within discrete sections of the continuously constructed flexible container such that harvested product sealed within a first discrete section of the container is isolated from harvested product sealed within a second discrete section of the container and the first discrete section is interconnected with the second discrete section;
   attaching a traceability device to a surface of each of the discrete sections of the continuously constructed flexible container to allow the harvested product included within each section to be tracked; and
   unwinding the continuously constructed flexible container from a roll, the roll being coupled to a combine harvester, and directing the continuously constructed flexible container including the interconnected harvested product-containing sealed sections of the continuously constructed flexible container from the combine harvester onto a field when the combine harvester is moving in a generally forward direction, thereby providing for in-field storage of the harvested product at a pre-determined rate, the continuously constructed flexible container being stored on a roll and connected to the combine harvester.

2. The method as claimed in claim 1, further comprising reading the traceability device following attaching the traceability device to each of the discrete sections.

3. The method as claimed in claim 2, wherein reading of the traceability device is performed by a device included with the combine harvester.

4. The method as claimed in claim 2, further comprising recording positional information of each discrete section of harvested product following reading the traceability device and storing the recorded positional information in a manner allowing accessibility by a user at a later time.

5. The method as claimed in claim 4, wherein recording of the positional information for each discrete section and storing said positional information is performed by at least one device included with the combine harvester.

6. The method as claimed in claim 1, further comprising collecting the continuously constructed flexible container following attaching the traceability device.

7. The method as claimed in claim 6, further comprising opening the continuously constructed flexible container causing the harvested product to be released into at least one of a transporting vehicle or storage device following the collecting the continuously constructed flexible container.

8. The method as claimed in claim 1, wherein the traceability device is at least one of a bar code or radio frequency identification (RFID) tag.

9. The method as claimed in claim 1, wherein sealing the harvested product within the continuously constructed flexible container in discrete sections includes use of a heat-seal operation.

10. The method as claimed in claim 1, wherein discrete sections includes sections of approximately one meter.

11. A system for collecting a harvested product, comprising:
    a continuously constructed flexible container for collecting the harvested product, the continuously constructed flexible container being configured as a tube, the tube being formed of a continuous sheet of flexible, plastic material;
    a sealing device operationally coupled to the continuously constructed flexible container to allow discrete sections of the container to be sealed such that harvested product collected and sealed in a first discrete section of the container is isolated from harvested product collected and sealed in a second discrete section of the container, the first discrete section of the container being interconnected with the second discrete section of the container; and
    a traceability device operationally coupled to a surface of each of the discrete sections of the continuously flexible container to allow the harvested product included within each section to be tracked,
    wherein the continuously constructed flexible container is configured for being unwound from a roll, the roll being coupled to a combine harvester and the system is configured for directing the harvested product-containing, interconnected, sealed first and second discrete sections of the continuously constructed flexible container from the combine harvester onto a field when the combine harvester is moving in a generally forward direction, thereby providing for in-field storage of the harvested product,
    wherein the use of the continuously constructed flexible container allows the harvested product to be collected continuously,
    wherein the system is operationally coupled to a combine harvester.

12. The system as claimed in claim 11, wherein the traceability device is at least one of a bar code or radio frequency identification (RFID) tag.

13. The system as claimed in claim 11, wherein the sealing device includes a heat-seal operation.

14. The system as claimed in claim 11, wherein discrete sections includes sections of approximately one meter.

15. The system as claimed in claim 11, wherein the traceability device is configured for providing information about an amount of harvested product within at least one of the continuously constructed flexible container and a discrete section included in the harvested product-containing sealed sections of the continuously constructed flexible container.

16. The system as claimed in claim 11, wherein the traceability device is configured for providing information about a harvest date for the harvested product.

17. The system as claimed in claim 11, wherein the traceability device is configured for providing information describing a type of the harvested product.

18. The system as claimed in claim 11, wherein the harvested product is storable in-field at a pre-determined rate.

* * * * *